United States Patent

[11] 3,626,792

| [72] | Inventor | Josef Eichenhofer<br>120 Oakdale Road, Brampton, Downsview 479, Ontario, Canada |
|---|---|---|
| [21] | Appl. No. | 27,791 |
| [22] | Filed | Apr. 13, 1970 |
| [45] | Patented | Dec. 14, 1971 |

[54] SWING STOP CONSTRUCTION FOR SCREW MACHINES
3 Claims, 4 Drawing Figs.

| [52] | U.S. Cl. | 82/34 A, 82/2.5 |
|---|---|---|
| [51] | Int. Cl. | B23b 13/12 |
| [50] | Field of Search | 82/2.5, 2.7, 34 A; 226/155; 29/37 |

[56] References Cited
UNITED STATES PATENTS

| 3,095,771 | 7/1963 | Vann et al. | 82/34 A |
|---|---|---|---|

FOREIGN PATENTS

| 930,681 | 7/1959 | Great Britain | 82/34 A |
|---|---|---|---|

Primary Examiner—Leonidas Vlachos
Attorney—Cumpston, Shaw & Stephens

ABSTRACT: For a screw machine having a power spindle and collet and an automatic bar feeder for feeding bar stock through said collet and spindle, an improved swing stop rotatably mounted to rotate from a rest position to a stock stop position, and including a cam for automatically shifting the swing stop longitudinally forward a limited distance to permit the bar stock to be overfed past said normal stop machine position, and adapted for further returning the stock and bar stop to normal machining position.

Patented Dec. 14, 1971

INVENTOR
JOSEF EICHENHOFER

BY *Cullen, Settle, Sloman & Cantor*

ATTORNEYS

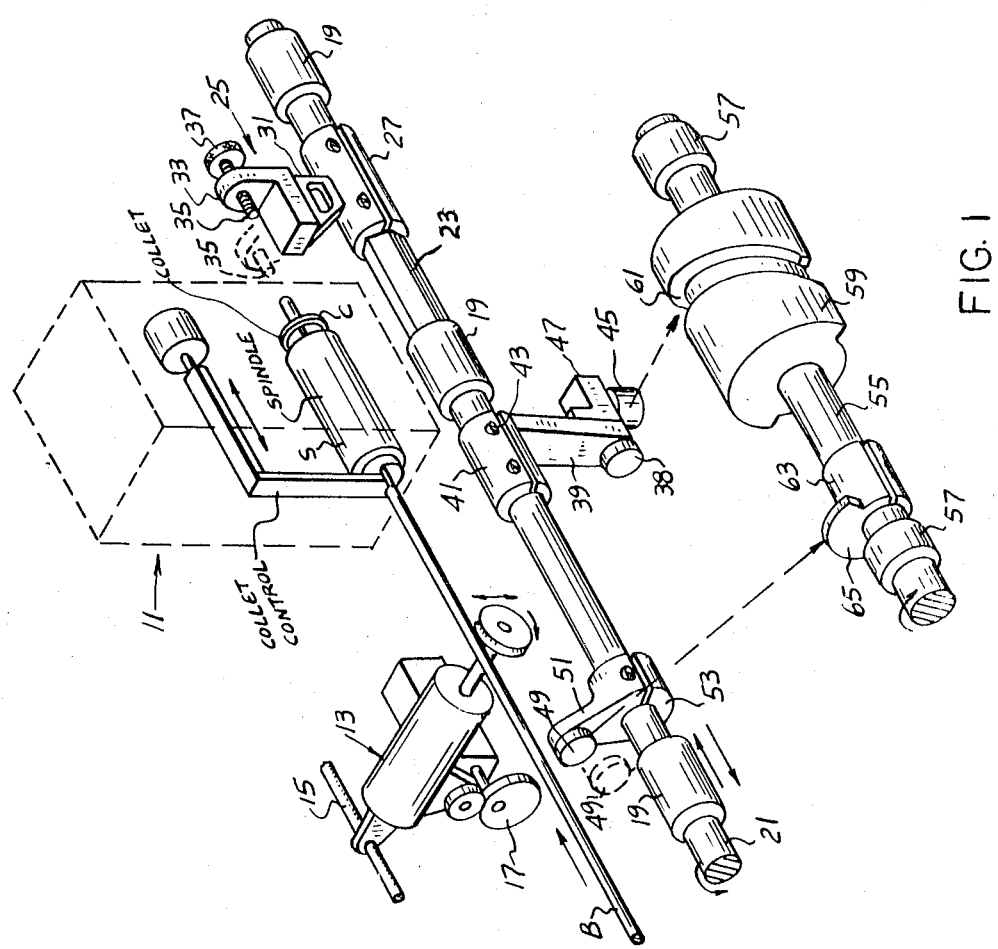

SWING STOP CONSTRUCTION FOR SCREW MACHINES

BACKGROUND OF THE INVENTION

Heretofore, in the operation of screw machines, automatic bar feeders have been employed, such as shown in Jamison U.S. Pat. No. 3,372,449 and in my copending U.S. Pat. application, Ser. No. 884,653 filed Dec. 12, 1969 entitled, Automatic Bar Feeder Attachment for Multiple Spindle Screw Machines. Heretofore, also, there have been employed a swing stop in conjunction with the automatic feeding of bar stock, said stops when operative, being axially aligned with the machine spindle for limiting infeeding of the stock through the spindle and collet, and prior to the gripping of the collet with the stock for the subsequent machining operation.

With such conventional swing stop, it was often uncertain as to whether the final portion of the stock was a sufficient length so that sufficient material remained to provide an available firm grip by the collet upon the stock for the final machining operation with the result that, the final piece of stock was improperly secured, resulting in, either a damaged workpiece or a damaged screw machine part.

All screw machines lose one machining position when a bar feeder is used for feeding. If you have an eight-spindle machine, you lose one position for feeding, thus having only seven left for machining. The same applies to six-spindle, five-spindle or four-spindle machines.

BRIEF DESCRIPTION OF THE INVENTION

With the present improved swing stop construction and control, the existing bar stop of the screw machine may be employed. Therefore, all positions are available for machining.

It is an object of the present invention to accomplish a sensor to insure that sufficient bar stock material is available for a firm grip on the stock (approximately 1 inch of length). For this purpose, it is necessary to allow the stock to feed out an additional inch, to that required for the particular item being machined, and then, assuming that the material has not cleared the collet and dropped free, pushed back that same inch to the true machining position.

If insufficient stock is left on the bar, this 1 inch of length will insure that the bar end will fall free into the chip tray and by not activating the check valve inherent in the swing stop, will stop the machine by action of the stock depletion device built into the system.

It is an object of the present invention to provide for this additional out and linear inward motion of the bar stock, which must be accomplished in the same time period as is presently allowed for the swing stop to rotate into position, allow the stock to feed, close the collet, and swing back to the rest position. If the stock is insufficient to produce another piece, the 1 inch forward linear movement will remove the stock from the collet, thereby losing its drive and unable to reach the stock stop. This will activate the stock depletion device built into the machine which will cut the power and stop the machine until reset.

It is a further object to provide an improved cam control which will assure such positioning of the swing stop from rest position to stock-retaining position and which will, furthermore, effect a longitudinal forward and successive return movement of the swing stop and which will, thereafter, provide for returning of the swing stop to rest position.

These and other objects will be seen from the following specification and claims in conjunction with the appended drawings.

DESCRIPTION OF THE FIGURES

FIG. 1 is a schematic perspective exploded view of the present swing stop and associated cam control mechanism with cams shown out of position.

DETAILED DESCRIPTION

Figure 2:
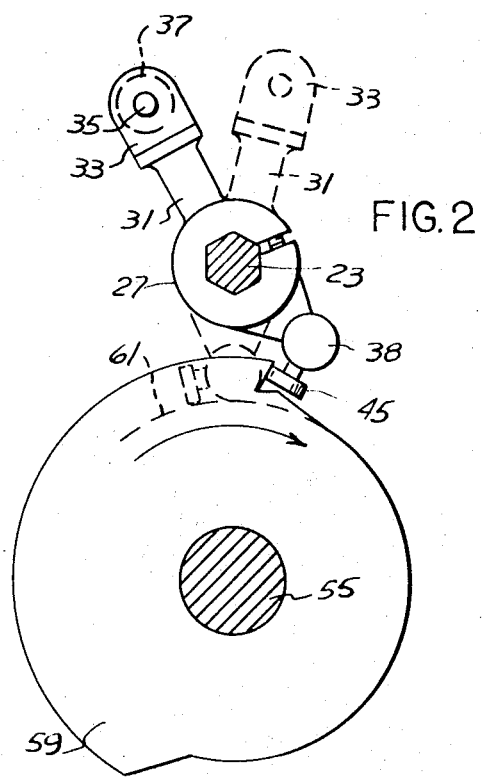
FIG. 2 is a fragmentary end elevational view of one control cam and swing stop in operative position.

A conventional type of screw machine is schematically illustrated at 11 as including power-driven spindle S including collet C adapted to receive axially therethrough an elongated bar stock designated as B. Said collet in a conventional manner and in accordance with the function of conventional screw machine being adapted to open and close at the correct time intervals for securing the stock in position after each individual longitudinal feed for the subsequent machining operation.

Further description as to the conventional operation of screw machine spindle and collet in arrangement is disclosed in Jamison U.S. Pat. No. 3,372,449 and in my copending U.S. Pat. application Ser. No. 884,653 filed Dec. 12, 1969 entitled, Automatic Bar Feeder Attachment for Multiple Spindle Screw Machines.

An automatic bar feeder or bar stock feeding mechanism is generally designated at 13, provided upon a pivot support 15 and under direction of control cam 17 is adapted for pivotal movements intermittently in a vertical plane whereby a drive mechanism frictionally and operatively engages the bar stock or bar for feeding the same axially of the spindle and collet until stopped by the swing stop mechanism.

The structure and detail of the present automatic bar feed mechanism is disclosed in my copending U.S. Pat. application, Ser. No. 884,653 and another form of automatic bar stock feed mechanism is shown in the aforementioned Jamison patent.

The present swing stop construction includes an elongated rotative shaft 21 supported and journaled within the longitudinally spaced bearings 19 mounted within the structure of the screw machine frame.

A portion of control shaft 21 is hex or, otherwise, irregularly shaped at 23 and has mounted and secured thereover swing stop assembly 25.

Said swing stop assembly includes a split mounting sleeve 27 having an internal hex or, otherwise, irregularly shaped bore so as to fit snugly over the shaft element 28 and be suitably secured thereto for rotative adjustments therewith.

Standard 31 projects radially outward of sleeve 27 and mounts an L-shaped stop support 33 mounting adjustable stop 35 of adjusting handle 37.

The swing stop 25 is shown in the drawing in a rest position normally displaced from the axis of said spindle S and is adapted for cam-controlled rotary movement to the dotted line position shown wherein the stop 35 is in axial registry with spindle S and associated collet and the bar stock B to be fed therethrough in an automatic manner for successive machining operations.

Mounted upon rotative shaft 21 is a first cam means which includes first cam roller 38 which is secured upon the end of radial arm 39 which extends from split sleeve 41 suitably secured as at 43 to shaft 21. First cam roller 38 is arranged radially outward of shaft 21 and extends axially thereof as shown in the drawing.

L-shaped cam support 47 is mounted upon the end of arm 39 and longitudinal feed second cam roller 45 is secured thereto and extends radially outward of the axis of shaft 21.

The cam means forming a part of the control mechanism additionally includes a further arm 51 extending radially from split sleeve 53 suitably secured upon shaft 21 and mounting at its end the third axially disposed cam roller 49, which is arranged substantially diametrically opposed from first swing stop cam roller 38.

Elongated power rotated camshaft 55 is spaced from and arranged parallel to rotatable shaft 21, is journaled within a portion of the screw machine upon the longitudinal spaced bearings 57.

Cam drum 59 is suitably secured to shaft 55 and includes a continuous U-shaped cam track 61 formed thereinto wherein the bight of said cam track extends longitudinally forward and with the end portions of said track diametrically opposed from each other upon opposite sides of shaft 55.

Upon the split sleeve 63 suitably secured upon shaft 55, there is provided an additional rotatable cam 65 adapted for coaction with the third cam roller 49 as hereafter described for returning the swing stop to rest position before the conventional machining operation of the screw machine.

OPERATION

With the swing stop assembly 25 in normal rest position such as during a machining operation, small diameter portion of drum 59 is in registry with the first cam roller 38 so that upon rotation of cam shaft 55 clockwise, cam drum 59 operatively engages first cam roller 38 for rotating swing stop assembly 25 from the position shown in the drawing to the fragmentary position designated in dotted lines wherein the stop 35 is in longitudinal registry with the stock for limiting in feeding thereof prior to the next machining operation; shown in dotted lines FIG. 1, and in solid lines FIG. 2.

Figure 4:
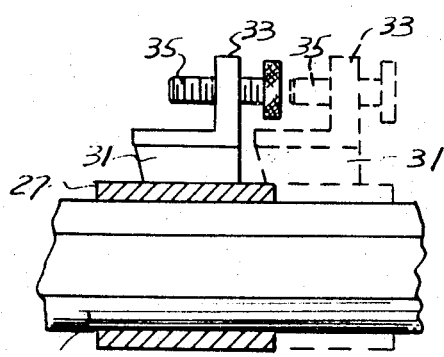
FIG. 4 is a fragmentary side elevational view showing the longitudinal movement of the feed stop.

At the same time, the second cam roller 45 is disposed within or adjacent to one end of the U-shaped cam track 61 so that on initial rotary movement of drum 59, there is transmitted to shaft 21 an initial forward longitudinal movement of approximately 1 inch for illustration, FIG. 4.

In the operation of the screw machine with the automatic feeder 13 in position, the bar stock B is biased axially inward for registry with the overfed swing stop, member 35 while the collet C is open. The automatic feed 13 is lowered and thus, interrupts further feeding of the bar stock B, and with the collet still open and with the drum 59 continuing its rotation, the U-shaped channel track 61 operating with respect to the cam 45, now returns the shaft 21 back to normal stop and machining position at which time the collet in an automatic manner grips the stock for the subsequent machining operation.

Figure 3:
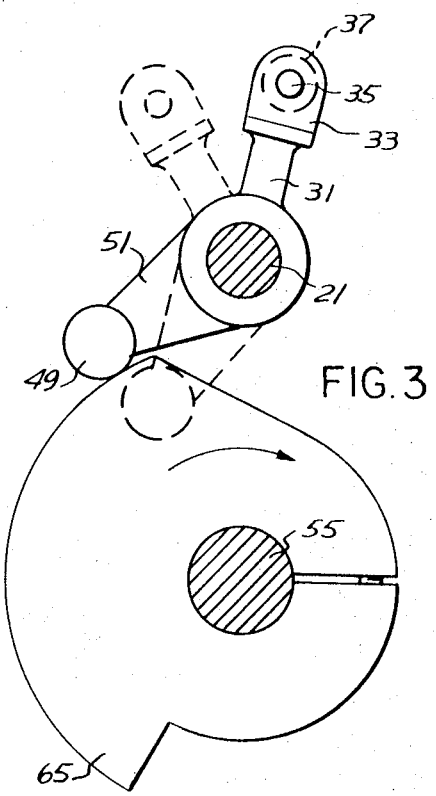
FIG. 3 is a similar view of the other control cam and said swing stop in rest position.

Before this occurs, however, the power-driven cam 65 is now in a position to operatively engage the third cam roller 49 so as to swing the swing stop from the workpiece-engaging position to the normal rest position shown in the drawing and this is followed by the machining operation, as in FIG. 3.

Since the operation of the screw machine is substantially continuous, the in-and-out linear motion of the bar stock must be accomplished in the same time period as is presently allowed for the swing stop to rotate into position, allow the stock to feed, close the collet and swing the stop back to the rest position.

Since the mechanism for opening and closing the collet in an automatic manner is conventional and forms a part of all screw machines, this description of such structure is omitted.

Since the structure and operation of the automatic bar feed and mechanism shown at 13 does not form a part of the present invention, its detailed structure is omitted. Reference thereto may be had in my copending Pat. application, Ser. No. 884,653 above referred to as providing a means for automatically biasing the stock inward and at timed intervals for operative engagement with the swing stop when in its work stop position.

Having described my invention, reference should now be had to the following claims.

I claim:

1. In a screw machine having a power-driven spindle and internal collet adapted to axially receive and grip an elongated bar stock and having a power operated bar feeder for intermittently feeding said bar stock outwardly thereof;

an improved swing stop assembly comprising an elongated control shaft rotatively journaled on an axis parallel to the spindle axis;

a swing stop secured to said shaft and extending radially thereof, having a rest position displaced from the spindle axis and rotatable to a stop position aligned with the spindle axis;

rotatable first cam means for rotating said shaft and swing stop from rest position to stop position, and successively back to rest position;

and second cam means operatively engageable with said shaft for shifting the shaft longitudinally forward a limited distance to permit the bar stock to be overfed past normal stop machine position, a distance to assume sufficient collet anchorage during machining;

said second cam means adapted to shift the shaft longitudinally in the reverse direction, returning said swing stop and bar stock to normal stop machining position.

2. In the screw machine of claim 1, said first cam means including a first cam roller secured to and arranged radially outward of said shaft and extending axially thereof;

a cam drum spaced from and rotatable on an axis parallel to said shaft and having a cam surface operatively engageable with said first cam roller;

and a second cam roller adjacent said first cam roller and extending radially outward;

said cam drum including a U-shaped channel track operatively receiving said second cam roller;

the bight of said U-shaped track extending angularly forward.

3. In the screw machine of claim 2, a power-rotated camshaft parallel to said first shaft and axially mounting said cam drum;

said first cam means including an additional cam on said camshaft out of phase with said cam drum;

and a third cam roller secured to and arranged radially outward of said shaft extending axially thereof, substantially diametrically opposed to said first cam roller, and adapted for successive engatement by said additional cam on said camshaft.

* * * * *